United States Patent [19]

Leiter et al.

[11] Patent Number: 4,837,595
[45] Date of Patent: Jun. 6, 1989

[54] PROCESS AND DEVICE FOR PHOTOGRAPHING MICROSCOPIC OBJECTS

[75] Inventors: Herbert Leiter, Wetzlar; Herbert Koch, Biebertal; Andreas Hund, Wetzlar; Guenter Reinheimer, Biebertal, all of Fed. Rep. of Germany

[73] Assignee: Ernst Leitz Wetzlar GmbH, Wetzlar, Fed. Rep. of Germany

[21] Appl. No.: 163,823
[22] PCT Filed: May 23, 1987
[86] PCT No.: PCT/DE87/00237
§ 371 Date: Mar. 9, 1988
§ 102(e) Date: Mar. 9, 1988
[87] PCT Pub. No.: WO88/00714
PCT Pub. Date: Jan. 28, 1988

[30] Foreign Application Priority Data

Jul. 12, 1986 [DE] Fed. Rep. of Germany ....... 3623615
Aug. 12, 1986 [DE] Fed. Rep. of Germany ....... 3627354

[51] Int. Cl.$^4$ .......................... G03B 7/08; G03B 17/48
[52] U.S. Cl. ......................................... 354/412; 354/79
[58] Field of Search ................................. 354/412, 79

[56] References Cited

U.S. PATENT DOCUMENTS

| | | | |
|---|---|---|---|
| 3,851,949 | 12/1974 | Kraft et al. ............................ | 350/18 |
| 4,118,719 | 10/1978 | Leiter et al. .......................... | 354/79 |
| 4,475,802 | 10/1984 | Onogi .................................. | 354/456 |
| 4,685,776 | 8/1987 | Inoue et al. .......................... | 350/502 |

FOREIGN PATENT DOCUMENTS 1901008 10/1969 Fed. Rep. of Germany .
2619853C2 11/1977 Fed. Rep. of Germany .
3432635A1 4/1985 Fed. Rep. of Germany .

Primary Examiner—Michael L. Gellner
Attorney, Agent, or Firm—Foley & Lardner, Schwartz, Jeffery, Schwaab, Mack, Blumenthal & Evans

[57] ABSTRACT

A process for photographing microscopic objects with consideration of exposure time values to be determined and for making visible a spatially variable measurement spot and an exposure format making before and after the exposure is indicated, which process proceeds according to the process steps which are prescribed in accordance with the claims. In addition to this, a microphotographic device for carrying out the process or processes, having a microscope tube with return mirror device and a photographic eyepiece, downstream of which there are disposed a device for measuring the brightness of an object detail as well as markings to make visible at least one detail measurement field and the image field of a camera in the observation beam path, the detail measurement field being adjustably constructed in the functional plane, which is a plane conjugate with the eyepiece intermediate image, in the region associated with the entire image field, and the detail measurement diaphragm being disposed in a first illumination beam path, as well as a carrier containing the image field marking being disposed in a second illumination beam path, and a first beam splitter combining the two illumination partial beam paths being provided, and a second beam splitter being disposed between the camera shutter and the eyepiece optical system of the microscope, in such a manner that the images, transmitted by the combined illumiation partial beam paths, of the detail measurement diaphragm and of the image field marking are reflected into the eyepiece intermediate image plane in a superposed manner, is described, graphically represented and claimed.

16 Claims, 1 Drawing Sheet

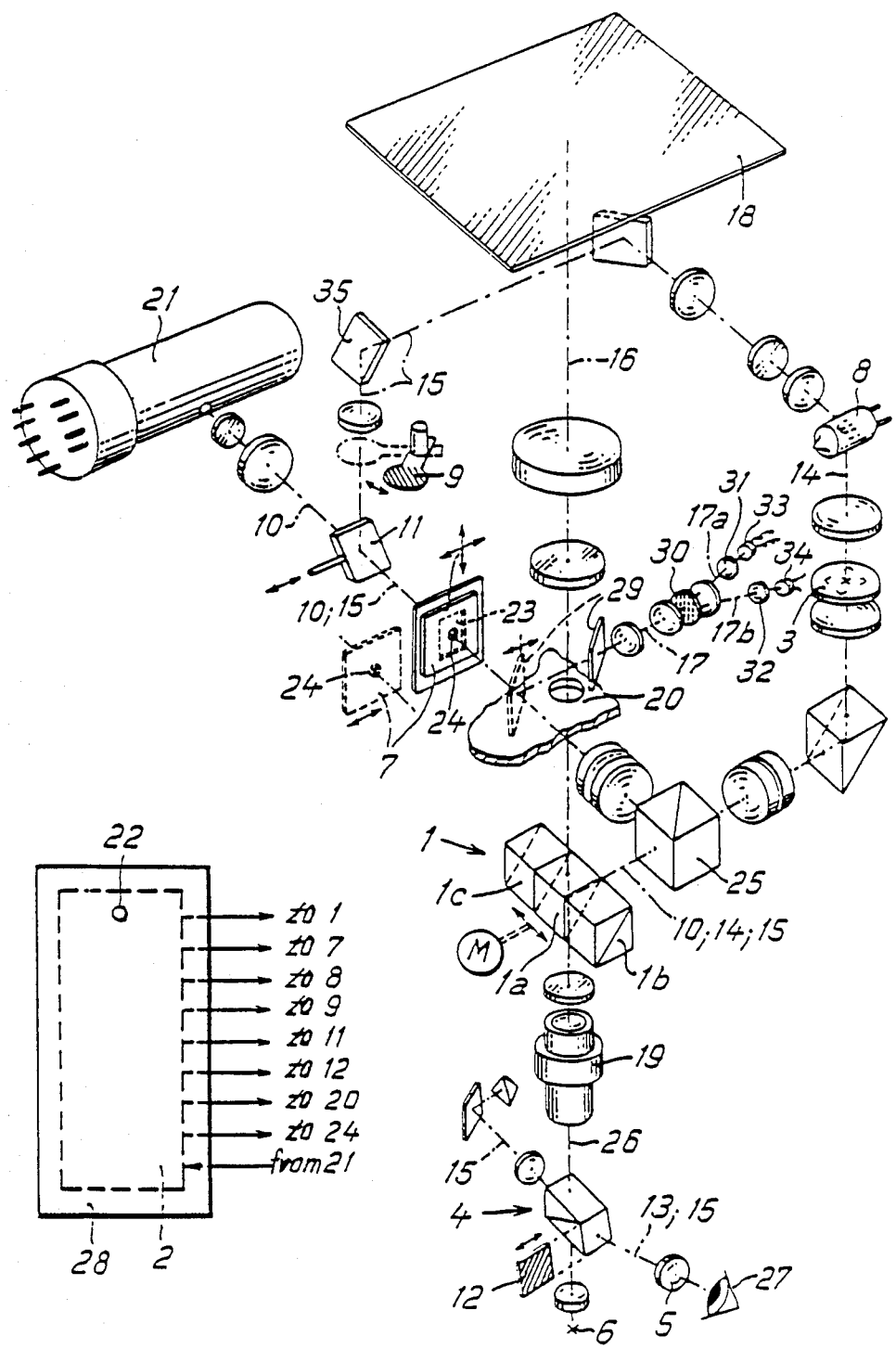

PROCESS AND DEVICE FOR PHOTOGRAPHING MICROSCOPIC OBJECTS

The invention relates to a process for selective photography with shortened and stored exposure time values or with exposure time values corrected during the exposure process, a measurement spot of variable spatial location as well as exposure field markings being made visible before and after the exposure, as well as to a device for carrying out this process.

German Patent Specification No. 2,619,853 discloses a microphotographic device as an attachment camera for microscopes, which permits an exposure correction during the exposure process by means of a fixedly built-in 50/50 neutral beam splitter. In this case, it is disadvantageous that the beam splitter fixedly disposed in the photographic beam path consumes 50% of the available quantity of light for the exposure control. As a result of this, only 50% of the light passes to the film. As a consequence of this, the exposure times are lengthened by the factor "two". This circumstance has a very disadvantageous effect, especially when—as is customary with special microscopy processes—objects of very low light intensity are to be observed and recorded.

It is therefore the object of the present invention to overcome the disadvantages of known microphotographic devices and processes and to provide a process as well as a device, with which process or with which device a great gain in time can be achieved, especially when large-format camera attachments are employed, and moreover there is an expansion of the photographic recording possibilities, especially of miniature fluorescence exposures with reduced exposure times, which are otherwise no longer possible, in consequence of object destruction with the formerly customary long times. A further partial object consists in furthermore obtaining the advantage of the exposure correction during the exposure for a series of practical cases of application with fluorescence exposures by the selection of the exposure program, i.e. in combining both photography with shortened exposure times and also the selective exposure correction during the exposure.

With a process of the initially mentioned type, this object is achieved, according to the invention, by the features of claim 1, as well as in each instance alternatively by claims 2, 3 or 4. Further refinements are evident from the process claims 5 to 8. The object is furthermore achieved by a device for carrying out the initially mentioned processes according to claim 9; further refinements are evident from the device claims 10 to 14.

An embodiment of the invention is diagrammatically represented in the drawing.

The photographic beam path 16 proceeds from an object 6 to be examined and extends along the optical microscope axis 26 via a photographic eyepiece 19, a beam splitter system 1 and a shutter 20 to the image exposure plane 18, in which, for example, a film can be positioned.

The observation beam path 13 likewise proceeds from the object 6 and is deflected at a splitter surface of a splitter prism disposed in the optical microscope axis 26 into the microscope eyepiece 5, where it passes to the observer 27. A dark flap 12 can, in the working position, keep extraneous light on the observer side away, in the case of specified program functions.

An illumination partial beam path 14 proceeds from a lamp 8, which illumination partial beam path, after passing through a format reticule 3, which moreover exhibits a sharpness cross, and after deflection at an appropriate optical component, onto a 50/50 beam splitter 25, where it it recombined with a further illumination partial beam path 15. The illumination partial beam path 15 likewise proceeds from the lamp 8 and, after two-fold deflection, impinges on a full mirror, which is disposed in the measurement beam path 10 so as to be slidable out and which can be designed also as a rotary mirror 11, and falls from there through a stationary integral measurement diaphragm 23 as well as a detail measurement diaphgram carrier 7, which is disposed immediately therebehind so as to be slidable out and which is held within its plane so as to be spatially variable, onto the already mentioned beam splitter 25, from which the combined illumination beam path 14 15 impinges on the beam splitter system 1. In the case represented, the glass cube 1a is situated in the working position, i.e. in the optical microscope axis 26. This glass cube 1a possesses a fullmirror-coated diagonal surface, which stands in a 45° position in relation to the vertical optical microscope axis 26 and to the combined illumination beam path 14, 15.

The beam splitter cube 1c disposed beside the glass cube 1a exhibits a beam splitter surface in the diagonal position, which exhibits a discrete transmission/reflection ratio between 95/5 and 99.5/0.5—preferably 99/1.

The beam splitter cube 1b exhibits a splitter surface in the diagonal position, which exhibits a transmission/reflection ratio of 50/50. It should be emphasized that use can be made, in addition or alternatively to the indicated beam splitter tubes, also of those which exhibit other physical or geometric beam splitting properties. The adjustment of the beam splitter system 1 takes place by motor.

The measurement beam path 10 proceeds from the beam splitter system 1, more precisely from the glass cube 1a situated in the working position in the drawing, and is thrown, after deflection at the beam splitter 25 when the full mirror (or rotary mirror 11) is swung out, onto the light receiver 21. The rotary mirror 11, which is shown as a flap mirror which can be moved out in the graphical representation, is moved by motor under program control and possesses a labyrinth, which, in the working position, closes off the light receiver 21 in a light-tight manner. This brings advantages for the dark-current compensation. Thus, for example with known microphotographic devices, it is only possible to achieve a dark-current compensation if use is made of a photographic tube which contains a slider setting in which no light can pass to the light-measuring device.

The dark flap 9 which is pivotable into the beam path 15 by motor under program control has two functions. In the case of integral measurement, the dark flap 9 is switched into the working position for the observation of the image, in order to prevent the integral measurement diaphgram 23 from being illuminated from behind. Otherwise, this would be superposed, in its entire magnitude, on the object image. The second function consists in that it remains switched on in the case of each light measurement. By this means, scattered light from the ventilation system of the lamp house is prevented from being superposed on the measurement light and falsifying the measurement.

The change between integral measurement and detail measurement takes place in the device according to the invention or the corresponding processes in such a manner that the integral measurement diaphragm 13 always remains fixed in its position. For a spot measurement, the spatially variable partial measurement diaphgram 24 or its carrier 7 is switched, for example by means of a lifting magnet, closely in front of the integral measurement diaphragm 23 by key pressure from the control unit 28. A gray filter (1%), which was formerly customary with a known microphotographic process and which adapted the transmission of the integral measurement diaphragm to the transmission of the detail measurement diaphragm, can be dispensed with in the case of the present invention, since, in place of this, a beam splitter cube 1c can be run into the working position. The detail measurement diaphragm carrier 7 is mounted, for example, by a lifting magnet on a carriage, which is operated by means of two electric motors from the control unit 28.

The markings for exposure fields on the format reticule 3 can be applied on a movable mask, which is adapted to a spherical-shell surface, which corresponds to the curvature of the image field. By this means, the image sharpness of the markings remains preserved over the entire field.

If required, a color temperature measurement beam path 17 can be constructed. The color temperature measurement is introduced by pushing the deflecting mirror 29 into the measurement beam path 10. The mirror 29 situated in the working position is registered, for example, by a reflex light barrier, which on its part switches over the control unit 28 to color temperature measurement. The measured color temperature appears in the display of the control unit 28, in place of the otherwise displayed film speed.

The control unit 28 is shown purely diagrammatically in the figure with the associated exposure control system 2 and the release key 22. The arrows illustrate the functional links to the individual opto-mechanical components.

In place of a color temperature measurement attachment, a computer flash sensor with a housing can also be fitted by means of the deflecting mirror 29. The position of the mirror 29 is recorded, again, by a reflex light barrier. An appropriate opto-electronic coupling leads, in the control unit 28, to an automatic flash readiness; in this case, when this function is operative switching takes place automatically to integral measurement.

The high transmission/reflection ratio of, for example, 99/1 of the splitter surface of the beam splitter cube 1c is achieved by the difference in refractive index between glass and cement layer of the pertinent component. The beam splitter system 1 is moved by motor under program control, and is positioned by fork light barriers, which are not shown.

We claim:

1. A process for photographing microscopic objects with consideration of exposure time values to be determined as well as for making visible a spatial variable measurement spot and an exposure format marking before and after the exposure, wherein a beam splitter system (1), which is disposed so as to be transversely displaceable in the photographic beam path (16) and which exhibits splitter surfaces of differeing transmission/reflection ratios (1b;1c) and, in addition, a full-mirror-coating surface (1a), a rotary mirror (11) disposed in the measurement beam path (10) in front of the light receiver (21) as well as a dark flap (9) disposed in the illumination beam path (15) are driven and positioned, in order to produce microphotographic exposures with shortened and stored exposure times, with execution of a spot measurement, by means of the spatially variable measurement spot, according to the following process steps:

(a) the beam splitter system (1) is positioned in the optical microscope axis (26) in such a manner that the full-mirror-coating surface of the glass cube (1a) in the diagonal position deflects the illumination beam paths (14 and 15 respectively) via the photographic eyepiece (19) into the microscope eyepiece (5);

(b) after setting of the image sharpness, selection of the image section of the object (6) and positioning of the spatially variable detail measurement diaphragm (24) by the observer (27) in the working position, there takes place an (c) actuation of a release key (22) on a control unit (28), whereby the following functions are initiated:

(c1) a lamp (8) is extinguished;

(c2) a dark flap (9) pivots into the illumination beam path (15);

(c3) the rotary mirror (11) pivots out of the measurement beam path (10);

(c4) a dark flap (12) in the observation beam path (13) swings into the working position;

(c5) the light receiver (21) measures the light falling through the detail measurement diaphragm (24), and the value measured by the light receiver (21) is then passed to an exposure control system (2) and stored;

(c6) the beam splitter system (1) is now positioned in such a manner that the beam splitter cube (1c) passes with that splitter surface in the diagonal position transversely to the optical microscope axis (26) which exhibits a transmission/reflection ratio of 99/1;

(c7) the exposure control system (2) opens the shutter (20), depending upon the respectively stored value, for an exposure of an image recording medium disposed in the plane (18), for example a film;

(c8) following completion of exposure and blocking of the shutter (20) for the further passage of the photographic beam path (16), the beam splitter system (1) is again guided back into the initial position—i.e. the glass cube (1a) in the working position—the lamp (8) being simultaneously switched on, the dark flaps (9 and 12, respectively) being switched out, the rotary mirror (11) being pivoted into the measurement beam path (10), and the image recording medium being further transported.

2. The process as claimed in claim 1, wherein the temporal sequence of the partial process steps (c1) to (c4) is a sequence selectable at will.

3. The process as claimed in claim 1, wherein, in addition, a color temperature measurement takes place by insertion of a deflecting mirror (29) into the measurement beam path (10), the color temperature measurement beam (17) thereby branched off being divided, after passing through an image splitting element, for example a line or prism raster (30), into two partial beams (17a;17b), in such a manner that the partial beam (17a) after passing through a blue filter (31) and the partial beam (17b) after passing through a red filter (32) each fall on a respective light receiver (33, and 34, respectively), for example silicon diodes.

4. The process as claimed in claim 1, wherein, in addition, a computer flash device is optically coupled to the total system by insertion of a deflecting mirror (29) into the measurement beam path, the microphotographic functions being automatically switched to integral measurement and a flash readiness being automatically produced in the control unit (28).

5. A microphotographic device for carrying out the process as claimed in claim 1, having a microscope tube with return mirror device and a photographic eyepiece, downstream of which there are disposed a device for measuring the brightness of an object detail as well as markings to make visible at least one detail measurement field and the image field of a camera in the observation beam path, the detail measurement field being constructed adjustably in the functional plane, which is a plane conjugate with the eyepiece intermediate image, in the region associated with the entire image field, and the detail measurement diaphragm being disposed in a first illumination beam path, as well as a carrier containing the image field marking being disposed in a second illumination beam path, a first beam splitter combining the two illumination partial beam paths being provided, and second beam splitter being disposed between the camera shutter and the eyepiece optical system of the microscope, in such a manner that the images, transferred by the combined illumination partial beam paths, of the detail measurement diaphragm and of the image field marking are reflected into the eyepiece intermediate image plane in a superposed manner, wherein, in place of the second beam splitter, a beam splitter system (1) is disposed in the optical microscope axis (26) so as to be transversely displaceable in relation to the latter, the beam splitter system (1), which is positionable by motor, including at least two beam deflection elements (1a,1b and 1a,1c, respectively), one of which is a glass cube (1a) with a diagonal full-mirror-coating surface and the other is a beam splitter cube (1c) with a diagonal splitter-mirror surface (1b) having a transmission/reflection ratio 50/50 or with a diagonal splitter-mirror surface (1c) having a transmission/reflection ratio > 1, and a dark flap (9) which can be pivoted in and out being disposed in the illumination beam path (15) for the detail measurement diaphragm (24) between the lamp (8) and a full-mirror-coated rotary mirror (11) which can be introduced into the measurment beam path (10).

6. The device as claimed in claim 5, wherein the beam splitter cube (1c) exhibits a discrete transmission/reflection ratio between 95/5 and 99.5/0.5—preferably 99/1.

7. The device as claimed in claim 5, wherein the beam splitter system (1) exhibits, in addition to the glass cube (1a) with a diagonal full-mirror-coating surface, at least two beam splitter cubes with discrete transmission/reflection ratios > 1.

8. The device as claimed in claim 5, wherein the beam splitters exhibit neutral and/or dichromatic splitter surfaces.

9. The device as claimed in claim 5, wherein, in addition, a deflecting mirror (29) which can be introduced into the measurement beam path (10) is provided, from which a color temperature measurement beam path (17) proceeds, which, after passing through a raster (30), is split up into two partial beams (17a, 17b), which, after passing through a blue filter or a red filter, respectively (31 and 32, respectively), impinge on respective light receivers (33 and 34, respectively).

10. The device as claimed in claim 5, wherein, in order to achieve a transmission/reflection ratio of the splitter-mirror surface of the beam splitter cube (1c) between 95/5 and 99.5/0.5, a respective discrete difference exists between the refractive index of the prism material and that of the cement layer material of the beam splitter cube (1c).

11. A process for photographing microscopic objects with consideration of exposure time values to be determined, as well as for making visible an exposure format marking before and after the exposure, wherein a beam splitter system (1), which is disposed so as to be transversely displaceable in the photographic beam path (16) and which exhibits splitter surfaces of differing transmission/reflection ratios (1b;1c) and, in addition, a full-mirror-coating surface (1a), a rotary mirror (11) disposed in the measurement beam path (10) in front of the light receiver (21), as well as a dark flap (9) disposed in the illumination beam path (15) are driven and positioned, to produce microphotographic exposures with shortened and corrected exposure times, with the execution of an exposure correction, with integral measurement, according to the following process steps:

(a) the beam splitter system (1) is positioned in the optical microscope axis (26) in such a manner that the full-mirror-coating surface of the glass cube (1a) in the diagonal position deflects the illumination beam path (14) via the photographic eyepiece (19) into the microscope eyepiece (5);

(b) after setting of the image sharpness and selection of the image section of the object (6) by the observer (27), there takes place an (c) actuation of a release key (22) on a control unit (28), whereby the following functions are initiated:

(c1) with the back flap (9) left in the illumination beam path (15), a lamp (8) is extinguished;

(c2) the rotary mirror (11) is pivoted out of the measurement beam path (10);

(c3) the detail measurement diaphragm carrier (7) is pivoted out of the measurement beam path (10);

(c4) a dark flap (12) is introduced into the observation beam path (13);

(c5) the beam splitter system (1) is now positioned in such a manner that the beam splitter cube (1c) passes with that splitter surface in the diagonal position in relation to the optical microscope axis (26) which exhibits a transmission/reflection ratio of 99/1;

(c6) the light receiver (21) measures the light falling through a stationary integral measurement diaphragm (23), which is released by displacement of the carrier (7) exhibiting the detail measurement diaphragm (24), out of the measurement beam path (10), and the measured value is then passed to an exposure control system (2) and stored;

(c7) the exposure control system (2) opens the shutter (20), depending upon the respectively measured value, for an exposure of an image recording medium disposed in the plane (18), for example a film, the exposure measurement taking place during the exposure process and, in the case of varying object brightnesses, an appropriate correction of the exposure time being simultaneously undertaken, (c8) following completion of exposure and blocking of the shutter (20) for the further passage of the photographic beam path (16), the beam splitter system (1) is again guided back into the initial position—the glass cube (1a) therefore in the working position—at the same time the lamp (8) being switched on, the rotary mirror (11) being pivoted into the measurement beam path (10), the dark flap (12) being switched out, and the image recording medium being further transported.

12. The process as claimed in claim 11, wherein the temporal sequence of the respective partial process steps (c1) to (c5) is a sequence selectable at will.

13. A process for photographing microscopic objects with consideration of exposure time values to be determined, as well as for making visible a spatially variable measurement spot and an exposure format marking before and after the exposure, wherein a beam splitter system (1), which is disposed so as to be transversely displaceable in the photographic beam path (16) and which exhibits splitter surfaces of differing transmission/reflection ratios (1b;1c) and, in addition, a full-mirror-coating surface (1a), a rotary mirror (11) disposed in the measurement beam path (10) in front of the light receiver (21), as well as a dark flap (9) disposed in the illumination beam path (15) are driven and positioned, to produce microphotographic exposures with corrected exposure times, with the execution of a spot measurement, by means of the spatially variable measurement spot, according to the following process steps:
 (a) the beam splitter system (1) is positioned in the optical microscope axis (26) in such a manner that the glass cube (1a) with full mirror in the diagonal position deflects the illumination beam paths (14 and 15) via the photographic eyepiece (19) into the microscope eyepiece (5);
 (b) after setting of the image sharpness and selection of the image section of the object (6) by the observer (27), the spatially variable detail measurement diaphragm (24) is illuminated rearwards, with the dark flamp (9) swung out of the illumination beam path (15), and is brought into coincidence with a position of the object (6) which is representative of a correct exposure;
 (c) thereafter, a release key (22) on a control unit (28) is actuated, whereby the following functions are initiated:
  (c1) a lamp (8) is extinguished;
  (c2) the dark flap (9) pivots into the illumination beam path (15);
  (c3) the rotary mirror (11) is pivoted out of the measurement beam path (10);
  (c4) a dark flap (12) is introduced into the observation beam path (13);
  (c5) the beam splitter system (1) is now positioned in such a manner that the beam splitter cube (1b) passes with that splitter surface in the diagonal position in relation to the optical microscope axis (26) which exhibits a transmission/reflection ratio of 50/50;
  (c6) the light receiver (21) measures the incident light and the measured value is then passed to an exposure control system (2), and <(c7) the exposure control system (2) opens the shutter (20), with consideration of the measured quantity of light, for an exposure of an image recording medium disposed in the plane (18), for example a film, occurring changes in the brightness of the object (6) being corrected;
  (c8) following completion of exposure and blocking of the shutter (20) for the further passage of the photographic beam path (16), the beam splitter system (1) is again guided back into the initial position—the glass cube (1a) therefore in the working position—the lamp (8) being simultaneously switched on, the rotary mirror (11) being pivoted into the measurement beam path (10), the dark flaps (9 and 12 respectively) being switched out, and the image recording medium being further transported.

14. The process as claimed in claim 13, wherein the temporal sequence of the respective partial process steps (c1) to (c5) is a sequence selectable at will.

15. A process for photographing microscopic objects, with consideration of exposure time values to be determined, as well as for making visible a spatially variable measurement spot and an exposure format marking before and after the exposure, wherein a beam splitter system (1), which is disposed so as to be transversely displaceable in the photographic beam path (16) and which exhibits a beam splitter cube (1c) with a splitter layer having a discrete transmission/reflection ratio within the range between 95/5 and 99.5/0.5, and, in addition, a glass cube having a full-mirror-coating surface (1a), a rotary mirror (11) disposed in the measurement beam path (10) in front of the light receiver (21), as well as a dark flap (9) disposed in the illumination beam path (15), are driven and positioned, to produce microphotographic exposures with shortened and corrected exposure times, with the execution of a spot measurement, by means of the spatially variable measurement spot, according to the following process steps:
 (a) the beam splitter system (1) is positioned in the optical microscope axis (26) in such a manner that the full-mirror-coating surface of the cube (1a) in the diagonal position deflects the illumination beam paths (14 and 15, respectively) via the photograhic eyepiece (19) into the microscope eyepiece (5);
 (b) after setting of the image sharpness, selection of the image section of the object (6) and positioning of the spatially variable detail measurement diaphragm (24) by the observer (27) in the working position, there takes place an
 (c) actuation of the release key (22) on a control unit (28), whereby the following functions are initiated:
  (c1) the lamp (8) is extinguished;
  (c2) the dark flap (9) pivots into the illumination beam path (15);
  (c3) the rotary mirror (11) pivots out of the measurement beam path (10);
  (c4) the dark flap (12) in the observation beam path (13) swings into the working position;
  (c5) the light receiver (21) measures the light falling through the detail measurement diaphragm (24), and the value measured by the light receiver (21) is then passed to an exposure control system (2) and stored;
  (c6) the beam splitter system (1) is now positioned in such a manner that the beam splitter cube (1c) passes into the diagonal position in relation to the optical microscope axis (26);
  (c7) the detail measurement diaphragm carrier (7) with the detail measurement diaphragm (24) pivots out of the measurement beam path (15);
  (c8) the light receiver (21) measures the light falling through the integral measurement diaphragm (23), the value measured by the light receiver (21) is again passed to the exposure control system (2), which then associates with the just measured value such an exposure time which corresponds to that time which was determined according to the partial step (c5);

(c9) the exposure control system (2) opens the shutter (20) for an exposure of an image recording medium disposed in the plane (18), for example a film, the exposure measurement taking place during the exposure process and, with varying object brightnesses, an appropriate correction of the exposure time being simultaneously undertaken;

(c10) following completion of exposure and blocking of the shutter (20) for the further passage of the photographic beam path (16), the beam splitter system (1) is again guided back into the initial position—the glass cube (1a) therefore in the working position—at the same time the lamp (8) being switched on, the rotary mirror (11) being pivoted into the measurement beam path (10), the dark flaps (9 and 12, respectively) being switched out, and the image recording medium being further transported.

16. The process as claimed in claim 15, wherein the temporal sequence of the partial process steps (c1) to (c4) is a sequence selectable at will.

* * * * *